United States Patent
Arnal Valero et al.

(10) Patent No.: US 9,113,503 B2
(45) Date of Patent: Aug. 18, 2015

(54) COOKING HOB WITH SEVERAL HEATING ELEMENTS AND AT LEAST ONE POWER ELECTRONICS SUBASSEMBLY

(75) Inventors: Adolfo Arnal Valero, Saragossa (ES); Ignacio Garde Aranda, Saragossa (ES); Pablo Jesus Hernandez Blasco, Cuarte de Huerva (Saragossa) (ES); Sergio Llorente Gil, Saragossa (ES); Daniel Palacios Tomas, Saragossa (ES); Ramon Peinado Adiego, Saragossa (ES); Jose Alfonso Santolaria Lorenzo, Monzón(Huesca) (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 425 days.

(21) Appl. No.: 13/131,912

(22) PCT Filed: Dec. 9, 2009

(86) PCT No.: PCT/EP2009/066668
§ 371 (c)(1),
(2), (4) Date: May 31, 2011

(87) PCT Pub. No.: WO2010/069825
PCT Pub. Date: Jun. 24, 2010

(65) Prior Publication Data
US 2011/0226756 A1    Sep. 22, 2011

(30) Foreign Application Priority Data
Dec. 19, 2008    (ES) .................................. 200803707

(51) Int. Cl.
*H05B 6/12*    (2006.01)
*H05B 6/06*    (2006.01)

(52) U.S. Cl.
CPC .............. *H05B 6/1209* (2013.01); *H05B 6/065* (2013.01); *H05B 2213/03* (2013.01); *Y02B 40/123* (2013.01)

(58) Field of Classification Search
CPC . H05B 6/1209; H05B 6/062; H05B 2206/022
USPC .................................................. 219/600–677
See application file for complete search history.

(56) References Cited

U.S. PATENT DOCUMENTS 5,283,412 A * 2/1994 Gouardo et al. .............. 219/627
5,808,280 A * 9/1998 Gaspard ........................ 219/624
(Continued)

FOREIGN PATENT DOCUMENTS

CN    2814872 Y    9/2006
CN    1874621 A    12/2006
(Continued)

OTHER PUBLICATIONS

Report of Examination Including National Search Report CN 200980151035.2 dated Dec. 4, 2012.
International Search Report PCT/EP2009/066668.
National Search Report ES P200803707.

*Primary Examiner* — Tu B Hoang
*Assistant Examiner* — Thomas Ward
(74) *Attorney, Agent, or Firm* — James E. Howard; Andre Pallapies

(57) ABSTRACT

A cooking hob, in particular an induction hob, includes several heating elements, at least one power electronics subassembly for generating a heating current for operating the heating elements, and a switching arrangement for making and breaking a connection between the power electronics assembly and the heating elements. The switching arrangement is constructed as an assembly that is separate from the power electronics assembly.

13 Claims, 3 Drawing Sheets

(56) References Cited

U.S. PATENT DOCUMENTS

| | | | |
|---|---|---|---|
| 6,498,325 B1 | 12/2002 | Akel et al. | |
| 7,423,244 B2 * | 9/2008 | Baier et al. | 219/624 |
| 2003/0178416 A1 * | 9/2003 | Fujii et al. | 219/621 |
| 2005/0218880 A1 * | 10/2005 | Ioffe | 323/371 |
| 2007/0102422 A1 * | 5/2007 | Thomas | 219/666 |
| 2009/0139980 A1 | 6/2009 | Acero Acero et al. | |
| 2010/0006563 A1 | 1/2010 | Schilling et al. | |

FOREIGN PATENT DOCUMENTS

| | | |
|---|---|---|
| EP | 0844807 A1 | 5/1998 |
| EP | 0971562 B1 | 11/2006 |
| EP | 1931177 A1 | 6/2008 |
| ES | 2143430 A1 | 5/2000 |

* cited by examiner

COOKING HOB WITH SEVERAL HEATING ELEMENTS AND AT LEAST ONE POWER ELECTRONICS SUBASSEMBLY

BACKGROUND OF THE INVENTION

The invention relates to a cooking hob comprising a plurality of heating elements and at least one power electronics assembly.

EP 0 971 562 B1 discloses an induction cooking hob comprising a plurality of heating elements, two power electronics assemblies for generating a heating current for operation of the heating elements, and a switching arrangement for making and breaking a connection between the power electronics assembly and the heating elements. In cooking hobs of the type in question, the switching arrangement is mounted on a circuit board with the inverters that form the power electronics assembly. Alternatively, simpler cooking hobs are also known, in which the heating elements are permanently wired to a power electronics assembly without an intermediate switching arrangement.

ES 21 43 430 B1 and the European patent application EP 09 86 287 A2 which is derived therefrom further disclose departing from the one-to-one correspondence of the assignment between inverters and inductors by connecting two inverters to a single inductor in order to achieve a briefly excessive heat output in a so-called "booster mode", such that the inductor can be operated by two inverters simultaneously.

BRIEF SUMMARY OF THE INVENTION

In particular, the object of the invention is to provide a cooking hob which has a flexible architecture.

The object is achieved in particular by the features of the independent claim. Advantageous embodiments of the invention emerge from the subclaims.

The invention relates to a cooking hob, in particular an induction cooking hob, comprising a plurality of heating elements, at least one power electronics assembly for generating a heating current for operation of the heating elements, and a switching arrangement for making and breaking a connection between the power electronics assembly and the heating elements.

In order to configure the architecture of the cooking hob in a more flexible manner, it is proposed to design the switching arrangement as an assembly which is separate from the power electronics assembly. Consequently, the same power electronics assembly can be used both in cooking hobs which have heating elements that are permanently wired to the power electronics assembly, and in cooking hobs which comprise a switching arrangement for making and breaking the connection between the heating element and the power electronics assembly. An adaptation of the switching arrangement and the power electronics assembly to various operating conditions can take place independently, such that the selected power electronics assembly can be different for various countries having various domestic electricity networks, for example. It is likewise possible inexpensively to replace an individual assembly in the context of servicing.

The advantages of the invention are particularly applicable in the case of induction cooking hobs, in which the heating elements are inductors and in which the power electronics assembly comprises at least one inverter for generating the heating current.

An independent power supply for a plurality of heating zones can be achieved if the power electronics assembly comprises at least two inverters. Due to a greater number of inverters and/or inductors, the complexity of the circuit arrangement increases, and therefore it becomes increasingly beneficial to provide a separate assembly as the number of inductors grows.

It is further proposed that the switching arrangement comprises a multiplicity of capacitors, each of these being assigned to a heating element embodied as an inductor. Since the switching arrangement usually comprises one output per inductor in any case, the resonance capacitor (which supplements the inductor to form a sympathetic resonance circuit) can very well be integrated in the switching arrangement.

If the assembly of the switching arrangement additionally comprises a pan detection circuit, this can be protected against interference effects of the power electronics assembly and/or the inverters, and the outputs to the inductors can be used for transferring test pulses or measurement currents to the inductors.

According to a further aspect of the invention, it is proposed that the assembly of the switching arrangement comprises a microcontroller for the actuation of switching elements of the switching arrangement. It is therefore possible to achieve a largely autonomous switching arrangement, which can be controlled using minimal control effort by a central control unit of the cooking hob.

According to a further aspect of the invention, the cooking hob comprises temperature sensors which are attached to the heating elements (these embodied as inductors), and a read-out circuit which is integrated in the assembly of the switching arrangement for the purpose of reading out measured values of the temperature sensors. As a result, further optional functions of the cooking hob, which might be omitted in cooking hobs costing less, can be integrated in the assembly of the switching arrangement. By virtue of the assembly, the power electronics assembly can therefore be adapted and/or supplemented flexibly in terms of choice and configuration.

It is further proposed that the power electronics assembly and/or the assembly of the switching arrangement comprises at least one plug connection means for establishing a communication connection and/or power supply connection between the power electronics assembly and the assembly of the switching arrangement. The installation can be simplified as a result, and the flexibility of the architecture can be further increased by the use of a standard plug connection.

In addition to the inverter or inverters, the power electronics assembly can also comprise a rectifier, a filter circuit and an interface to a domestic electricity network.

BRIEF DESCRIPTION OF THE DRAWINGS

Further advantages are derived from the following description of the drawing. Exemplary embodiments of the invention are illustrated in the drawing. The drawing, the description and the claims contain numerous features in combination. A person skilled in the art will also consider the features individually as appropriate, and derive suitable further combinations therefrom.

DETAILED DESCRIPTION OF EXEMPLARY EMBODIMENTS OF THE PRESENT INVENTION

Figure 1:
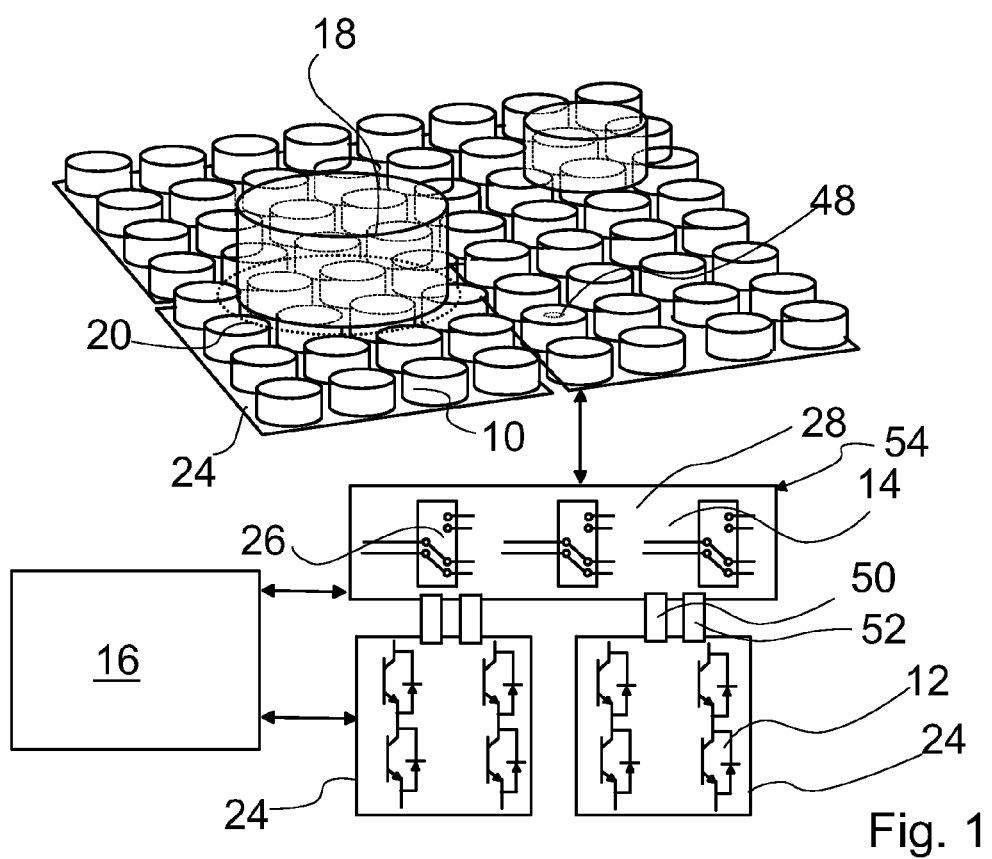
FIG. 1 shows an induction cooking hob comprising a multiplicity of heating elements, two power electronics assemblies and a circuit arrangement.

FIG. 1 shows an induction cooking hob comprising a multiplicity of heating elements, these being arranged in a matrix. The heating elements are inductors 10 which are operated by two power electronics assemblies 24. The power electronics assemblies 24 generate a high-frequency heating current and are connected to the inductors 10 via a switching arrangement 14. The switching arrangement 14 is used for making and breaking the connection between the power electronics assembly 24 and the heating elements (embodied as inductors 10), and comprises a number of electromechanical relays 26 or semiconductor relays.

In the exemplary embodiment illustrated in FIG. 1, the induction cooking hob has a matrix of 64 inductors 10 in total, these being arranged in a square grid of 8×8 points.

A control unit 16 of the induction cooking hob controls the operation of inverters 12 of the power electronics assembly 24 and actuates the switching arrangement 14 in such a way that the control unit 16 combines inductors 10 which are arranged in a vicinity of a base of an ovenware element 18, thereby forming flexibly definable heating zones 20. The inductors 10 that are combined to form a heating zone 20 are operated by the control unit 16 in a coordinated manner for the purpose of heating the ovenware element 18.

In this case, the inductors 10 that are combined to form the heating zone 20 are operated in such a way as to prevent destructive interferences between the inductors and humming of the induction cooking hob. To this end, the heating frequencies of the heating currents are coordinated, wherein the inductors 10 of a heating zone 20 are preferably operated at the same heating frequency, or a minimal distance of approximately 25 kHz is maintained between the heating frequencies, such that any arising intermodulation frequency is outside the frequency range that is audible to humans.

The number of inverters 12 in the power electronics assembly 24 of the induction cooking hob is far smaller than the number of inductors 10. In the exemplary embodiment illustrated in FIG. 1, one inverter 12 is assigned to each of four groups of inductors 10 in total. The elements of the switching arrangement 14 are mounted on a separate circuit board 28, which carries an assembly 54 that is separate from the power electronics assembly 24.

Figure 2:
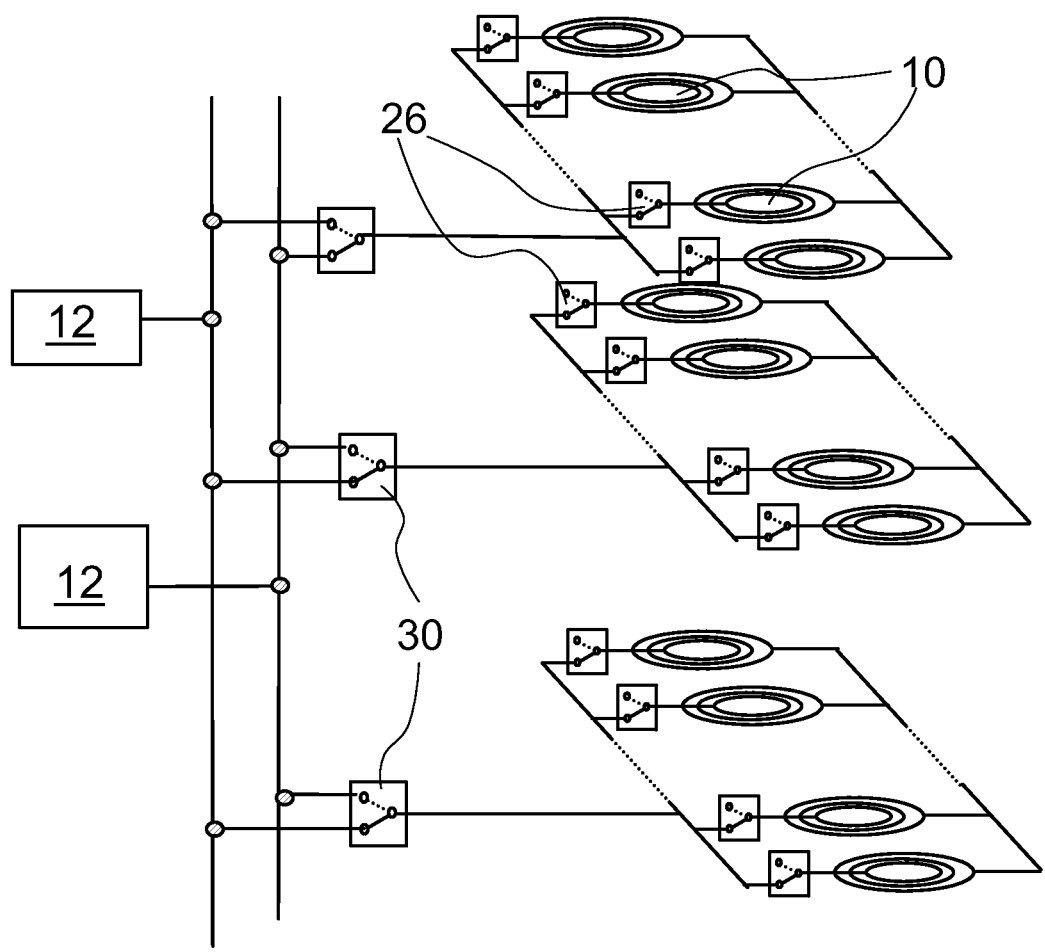
FIG. 2 shows a connection layout for the inverters of the power electronics assembly and the heating elements.

FIG. 2 shows a connection of the inverters 12 to the inductors 10 via the switching arrangement 14. The inductors 10 of a group are connected in parallel and the switching arrangement 14 comprises a relay 26 for each inductor 10, wherein said relay 26 makes a conductive connection between the inverter 12 and the inductor 10 in a first switch position, and interrupts this conductive connection in a second switch position. Using control lines, the control unit 16 can generate currents for the purpose of activating electromagnets of the relays 26 and thus actuate the electromagnets of the relays 26 independently of each other, in order to activate the relevant inductor 10 by making the connection between the inverter 12 and this inductor 10.

Figure 3:
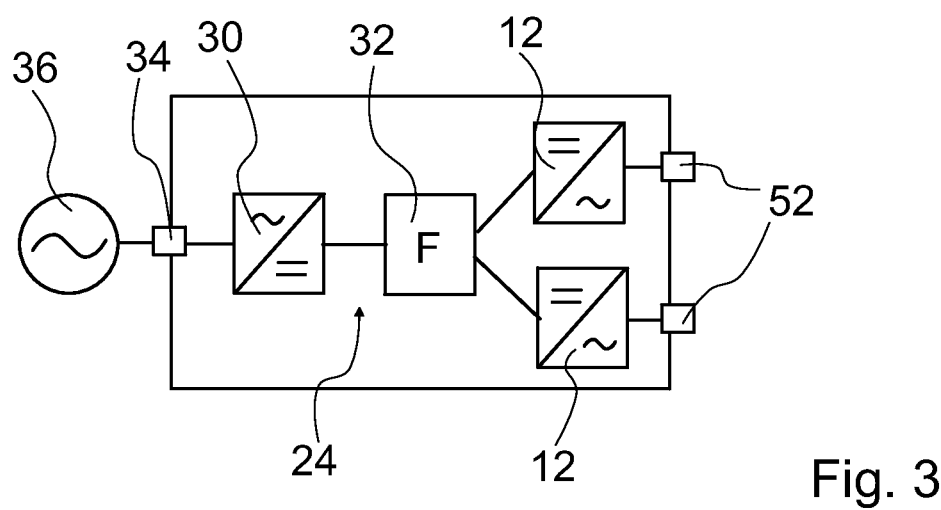
FIG. 3 shows the power electronics assembly from FIG. 1 in a detailed illustration.

FIG. 3 shows one of the power electronics assemblies 24 from FIG. 1 in a detailed illustration. The power electronics assembly 24 comprises two inverters 12 for generating the heating current. The inverters 12 are half-bridge inverters in the exemplary embodiment illustrated in FIG. 1. Also integrated in the power electronics assembly 24 are a rectifier 30, a filter circuit 32 and an interface 34 to a domestic electricity network 36.

Figure 4:
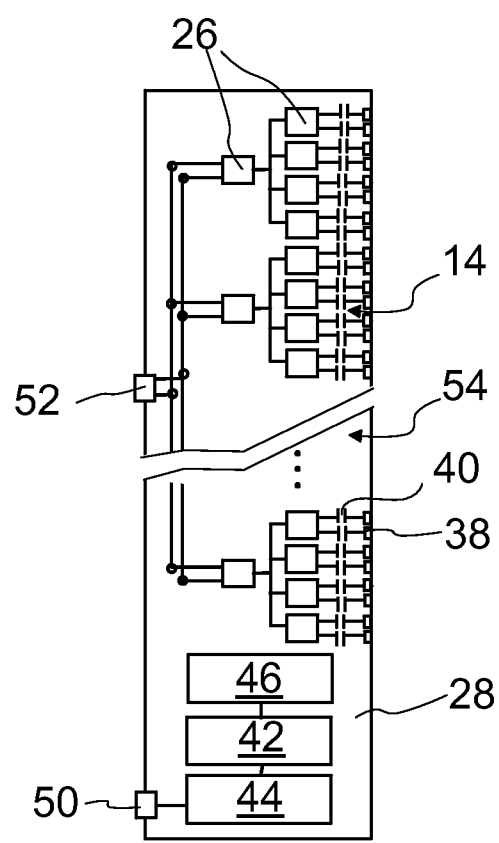
FIG. 4 shows the circuit arrangement from FIG. 1 in a detailed illustration.

FIG. 4 shows the switching arrangement 14 from FIG. 1 in a detailed illustration. The switching arrangement 14 has a multiplicity of output interfaces 38, each of which can be connected to one inductor 10. In this way, the inductors 10 can be controlled independently of each other. In addition, a multiplicity of capacitors 40 is integrated in the switching arrangement 14, being arranged in each case between a relay 26 and an output interface 38. The capacitors 40 are in each case assigned to one of the inductors 10 via the output interface 38, and the capacitors 40 supplement the relevant inductor 10 to form a series resonance circuit whose resonance frequency lies in the region of the frequency of the heating current, this being in the order of 75 kHz.

The assembly 54 of the switching arrangement 14 additionally comprises a pan detection circuit 42, which can likewise be connected to the inductors 10 via the relays 26. The pan detection circuit 42 generates low-voltage test pulses, which generate an oscillation in one of the series resonance circuits formed by the inductors 10 and the capacitors 40. From an attenuation of this oscillation, it is possible to deduce the presence of a cooking pan 18 and a degree of overlap between the cooking pan 18 and the relevant inductor 10. The control unit 16 can analyze the signals from the pan detection circuit 42.

Also integrated in the assembly 54 of the switching arrangement 14 are a microcontroller 44, for the actuation of the switching elements or relays 26 of the switching arrangement 14, and a readout circuit 46.

The inductors 10 each hold a temperature sensor 48 at their center, as illustrated in FIG. 1, the measured values of said temperature sensor 48 being read out by the readout circuit 46 and converted into a pulse-width modulated signal or a frequency-coded signal.

The power electronics assembly 24 and the assembly 54 of the switching arrangement 14 each comprise two complementary plug connection means 50, 52. The first plug connection means 50 is an interface for transferring low-voltage control signals, and is used for establishing a communication connection between the power electronics assembly 24 and the assembly 54 of the switching arrangement 14. The second plug connection means 52 connects the inverters 12 to the inputs of the switching units 26 of the switching arrangement 14, and is configured to transfer the heating currents, whose amplitude is in the order of 100 V.

REFERENCE SIGNS

10 Inductor
12 Inverter
14 Switching arrangement
16 Control unit
18 Ovenware element
20 Heating zone
24 Power electronics assembly
26 Relay
28 Circuit board
30 Rectifier
32 Filter circuit
34 Interface
36 Domestic electricity network
38 Output interface
40 Capacitor
42 Pan detection circuit
44 Microcontroller
46 Readout circuit
48 Temperature sensor
50 Plug connection means 52 Plug connection means
54 Assembly

The invention claimed is:

1. A cooking hob, comprising:
a plurality of heating elements including inductors;
at least one power electronics assembly for generating a heating current for operation of the heating elements, said power electronics assembly including at least one inverter for generating the heating current; and
a switching arrangement for making and breaking a connection between the power electronics assembly and the heating elements, said switching arrangement constructed as an assembly that is separate from the power electronics assembly,
wherein said switching arrangement comprises output interfaces, each of which is connected to one of the heating elements, switching elements, a pan detection circuit to detect a presence of an ovenware element and a degree of overlap between the ovenware element and a relevant inductor, a microcontroller to actuate the switching elements, and a readout circuit integrated to read out measured temperature values of the heating elements.

2. The cooking hob of claim 1, constructed in the form of an induction cooking hob.

3. The cooking hob of claim 2, wherein the power electronics assembly comprises at least two inverters.

4. The cooking hob of claim 1, wherein each said heating element comprises temperature sensors attached to the heating elements.

5. The cooking hob of claim 1, wherein the power electronics assembly and the switching arrangement each comprises a first plug connection for establishing a communication connection and a second plug connection for establishing a power supply connection between the power electronics assembly and the switching arrangement.

6. The cooking hob of claim 1, wherein the power electronics assembly comprises a rectifier, a filter circuit and an interface to a domestic electricity network.

7. A cooking hob, comprising:
a plurality of heating elements including inductors;
power electronics assemblies which operate the heating elements;
a switching arrangement assembly which is separate from the power electronics assemblies and which makes a conductive connection between the heating elements and the power electronics assembly in a first switch position, and interrupts the conductive connection in a second switch position, the switching arrangement assembly including a pan detection circuit to detect a presence of an ovenware element and a degree of overlap between the ovenware element and a relevant one of the inductors, a microcontroller to actuate the switching elements, a readout circuit integrated to read out measured temperature values of the heating elements, and output interfaces, each of which is connected to one of the heating elements; and
a control unit which controls the power electronics assemblies and actuates the switching arrangement so as to form a heating zone comprising selective heating elements to heat an ovenware element.

8. The cooking hob of claim 7, wherein each inductor is connected to one of the output interfaces, and the switching arrangement assembly comprises a relay for each inductor, and a multiplicity of capacitors assigned to the inductors in one-to-one correspondence, and which are each arranged between the relay and one of the output interfaces.

9. The cooking hob of claim 7, further comprising a first plug connection for establishing a communication connection, and a second plug connection for establishing a power supply connection, between the power electronics assembly and the switching arrangement assembly.

10. A cooking hob, comprising:
a plurality of heating elements;
power electronics assemblies which operate the heating elements;
a switching arrangement assembly operatively connected between the heating elements and the power electronics, which is separate from the power electronics assembly, and makes a conductive connection between the heating elements and the power electronics assembly in a first switch position, and interrupts the conductive connection in a second switch position, wherein the switching arrangement assembly includes a relay for each heating element, output interfaces, each of which is connected to one of the heating elements, and a multiplicity of capacitors assigned to the heating elements in one-to-one correspondence and which are each arranged between the relay and one of the output interfaces;
a control unit which controls the power electronics assemblies and the switching arrangement assembly so as to form a heating zone comprising selective heating elements to heat an ovenware element; and
a first plug connection for establishing a communication connection and a second plug connection for establishing a power supply connection between the power electronics assemblies and the switching arrangement assembly.

11. The cooking hob of claim 10, wherein the heating elements comprise inductors.

12. The cooking hob of claim 11, wherein the switching arrangement assembly comprises:
a pan detection circuit to detects a presence of an ovenware element and a degree of overlap between the ovenware element and a relevant inductor;
a microcontroller to actuate the switching elements; and
a readout circuit integrated to read out measured temperature values of the heating elements.

13. The cooking hob of claim 11, wherein the inductors of a heating zone are operated at the same heating frequency.

* * * * *

UNITED STATES PATENT AND TRADEMARK OFFICE
CERTIFICATE OF CORRECTION

| | | |
|---|---|---|
| PATENT NO. | : 9,113,503 B2 | Page 1 of 1 |
| APPLICATION NO. | : 13/131912 | |
| DATED | : August 18, 2015 | |
| INVENTOR(S) | : Arnal Valero et al. | |

It is certified that error appears in the above-identified patent and that said Letters Patent is hereby corrected as shown below:

Title Page, please insert

--(73) Assignee: BSH Hausgeraete GmbH, Munich (DE)--

Signed and Sealed this
Twenty-fourth Day of May, 2016

Michelle K. Lee
*Director of the United States Patent and Trademark Office*